United States Patent [19]

Barger, Jr. et al.

[11] 4,071,698
[45] Jan. 31, 1978

[54] TELEPHONE SYSTEM FOR AUDIO DEMONSTRATION AND MARKETING OF GOODS OR SERVICES

[75] Inventors: Franklin V. Barger, Jr., Long Beach; Richard M. Knox; Jefery R. Roberts, both of Los Angeles, all of Calif.

[73] Assignee: Franklin V. Barger, Jr., Long Beach, Calif.

[21] Appl. No.: 758,159

[22] Filed: Jan. 10, 1977

[51] Int. Cl.² ................... H04M 11/00; H04M 11/08
[52] U.S. Cl. .................................... 179/2 R; 179/2 A
[58] Field of Search .................... 179/2 R, 2 A, 2 CA Primary Examiner—George G. Stellar
Attorney, Agent, or Firm—Kleinberg, Morganstern, Scholnick & Mann

[57] ABSTRACT

A system is disclosed for marketing merchandise or services by telephone using brief prerecorded audio demonstrations stored in an audio program repeater and connected to a customer's telephone line by a switching system under control of a data processor in response to a code entered by a customer service operator via the switching system or a code entered directly by the customer through his push-button telephone. In the latter case the data processor is in direct communication with the customer who uses the telephone push buttons to respond to prerecorded messages transmitted from the audio program repeater under control of the data processor. Otherwise the customer communicates with a customer service operator through the switching system and the customer service operator in turn selects the demonstration through the data processor. Having heard the demonstration, the customer indicates whether or not he wishes to purchase the merchandise or services, either to the customer sevice operator, who enters the purchase order in the data processor, or directly to the processor by telephone push-button operation. The data processor then transfers the order to an order processing system and updates both inventory records and the customer's history record.

17 Claims, 7 Drawing Figures

FIG. 3a
FIG. 3b
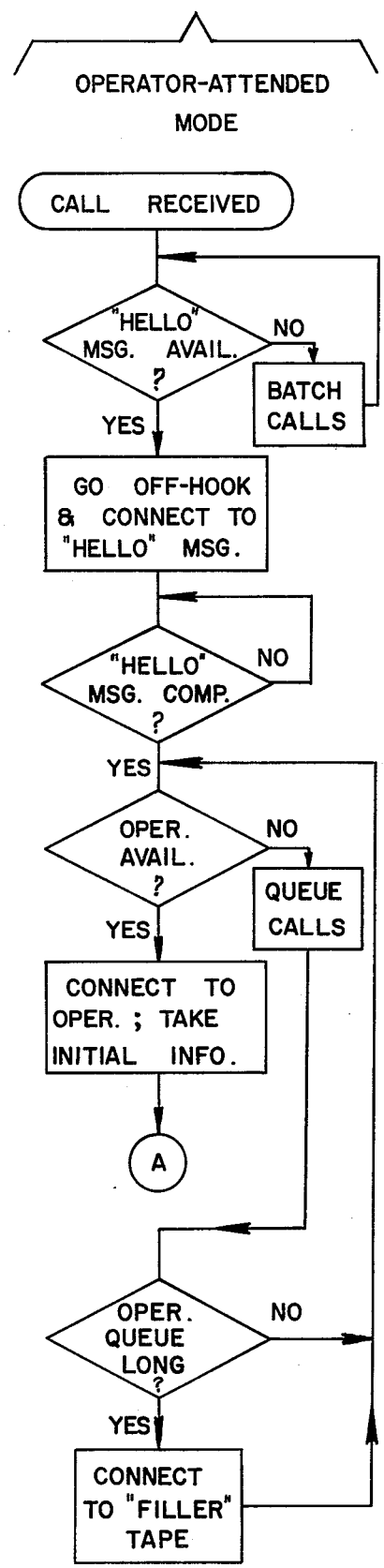
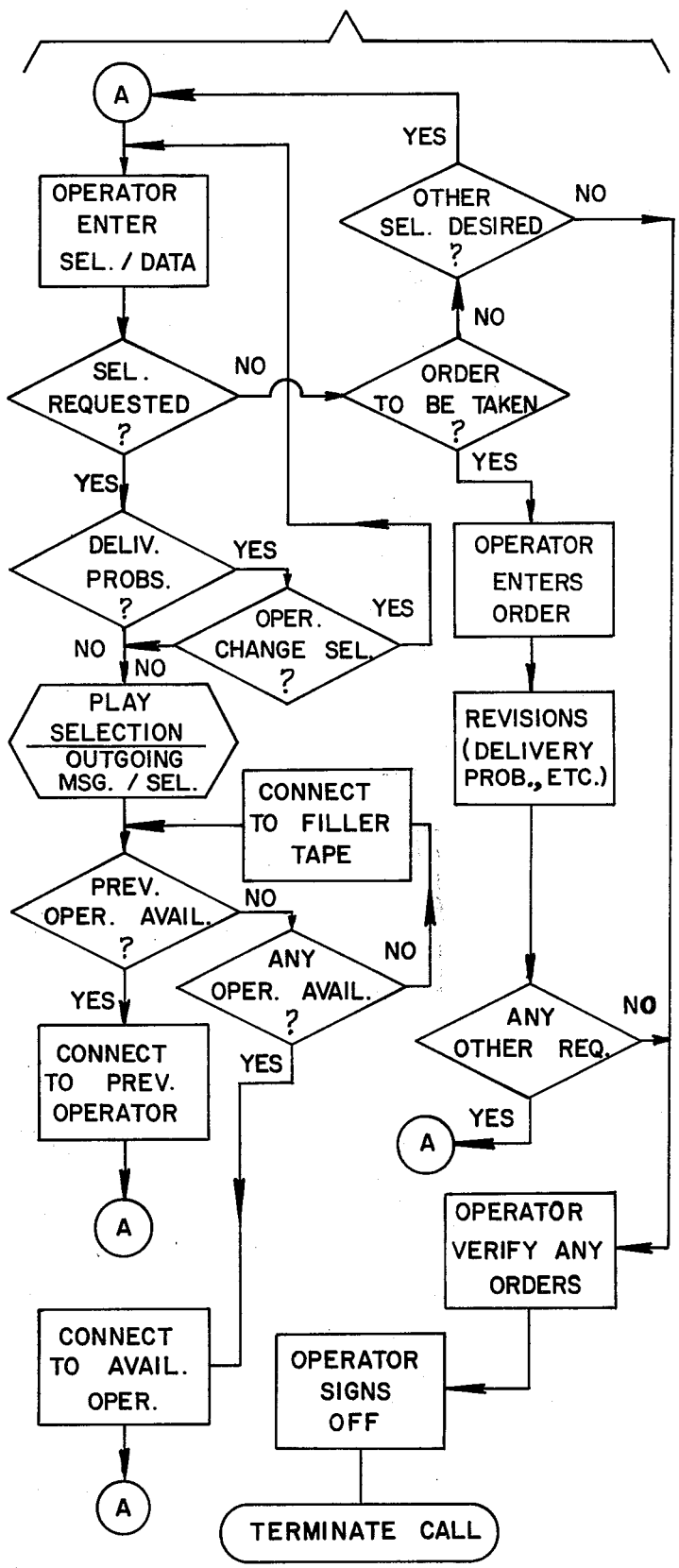

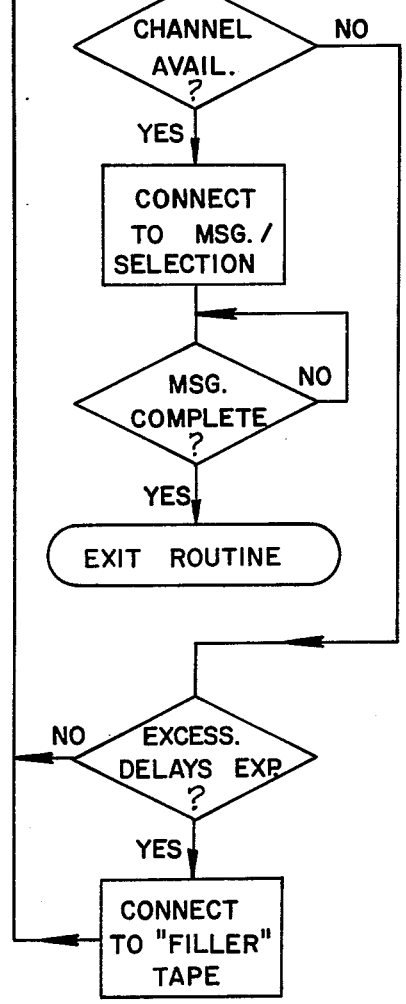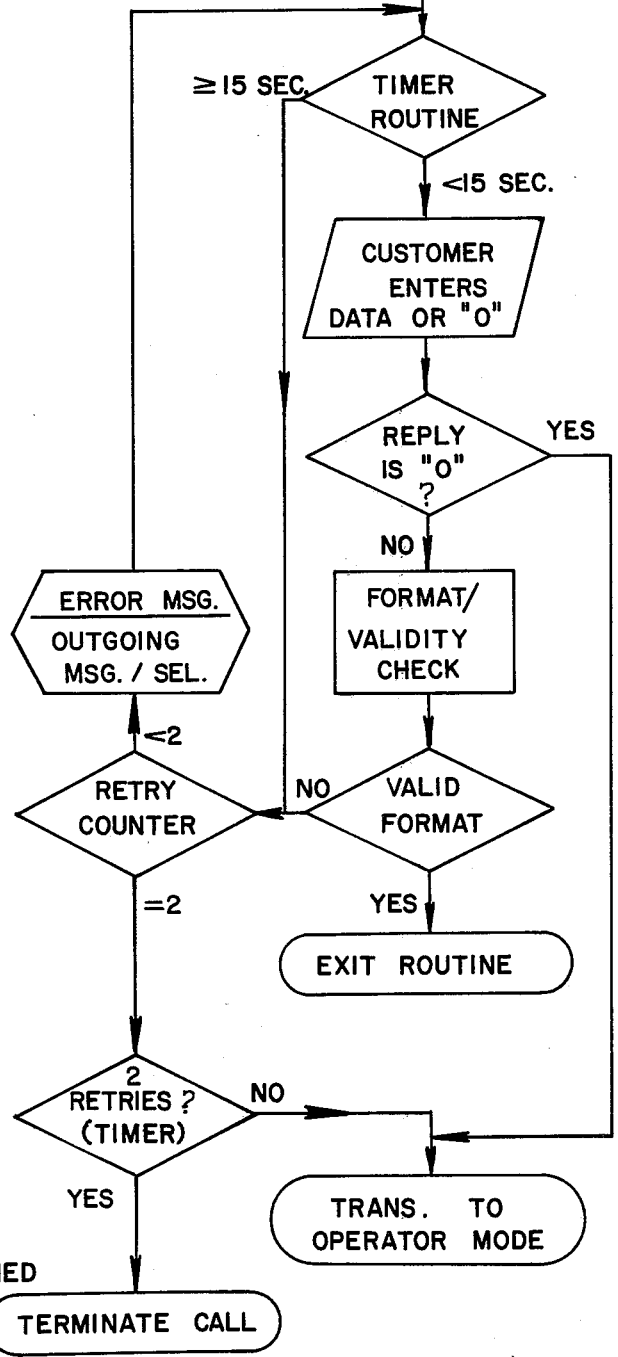

TELEPHONE SYSTEM FOR AUDIO DEMONSTRATION AND MARKETING OF GOODS OR SERVICES

BACKGROUND OF THE INVENTION

This invention relates to a system for marketing merchandise or services capable of being demonstrated to prospective customers over telephone lines, such as phonograph records or tapes (cartridges or cassettes), books, plays and tours, and for immediately accepting orders of selected merchandise or services.

The recording industry faces a very real and potentially serious problem in marketing phonograph records and tapes. Over the past 20 years or more, manufacturers of such recordings have prospered by directing a majority of their sales efforts to the youth. This youth market has been viewed as ever increasing due to at least one factor which is subsiding, namely a steady population growth. However planned parenthood has severely curtailed the rate of population growth so that the recording industry must look to the older adult groups for a continued market growth.

The recording industry has largely ignored the preferences and shopping habits of adults who have neither the time nor the inclination to keep abreast of the most recent recordings offered, much less to browse through the most recent recordings offered by the industry through record stores. The problem of reaching the adult market is becoming more difficult because record stores no longer provide facilities for the customer to listen to recordings as they did in the early days of the recording industry.

Record clubs have provided a convenient way for more mature individuals to buy recordings through the mail, but the selection must necessarily be made solely from a catalog description of the recordings offered. Consequently, even though one may know the title of a musical composition in mind, and sometimes even the name of the recording artist, one would like to confirm that the recording being considered from the catalog is the particular one in mind. There is therefore a great need for some way of demonstrating recordings to customers at remote locations to enable them to decide on purchases.

In addition to phonograph records and tapes, mature individuals are inclined to purchase other goods susceptible of audio demonstration such as books or recordings of books, movies, stage shows, plays, video disks or tapes, pay television shows and the like. They may even be inclined to purchase still other types of merchandise and services susceptible of being adequately described in an audio presentation, such as tours abroad, current stock market analysis of particular securities, and so forth.

OBJECTS AND SUMMARY OF THE INVENTION

An object of this invention is to provide a telephone system which enables a customer shopping for merchandise or services susceptible of audio demonstration to request that a particular demonstration be played over the telephone.

A further object of the invention is to provide a system for permitting a customer to place orders for merchandise or services after listening to audio demonstrations as desired and to arrange for payment by some credit account number or other means, whereupon the merchandise or services (or tickets for services) are dispatched to the customer by mail or other delivery service.

Still another object is to maintain a complete record of all transactions, including the requests for demonstrations to be played by each customer, in order to maintain current inventory records for the purpose of accepting orders and determining trends, and with respect to particular customers, to maintain an historical record from which, for example, the customer's particular preferences can be determined.

Yet another object is to provide a telephone system for customer selected audio demonstrations without human intervention in operation.

These and other objects and advantages of the present invention are achieved by data transmitting and receiving means coupling public telephone lines to a data processor and, through switching means, to channels of an audio program repeating means and, in one mode, to customer service operators under control of the data processor. The coupling means includes automatic telephone answering means to initially connect a customer with the data processor which causes the audio program repeating means to acknowledge the call through the switching means with a greeting message from the audio repeating means, and to assign the call to one of a plurality of operators, if required, who then communicates with the customer through the switching means. Otherwise the data processing means continues to communicate with the customer by control of the audio repeating means in either a second or a third mode to be summarized more fully hereinafter. In the first mode, the operator elicits required information from the customer, such as name and account number, demonstrations desired, and orders for the merchandise or services demonstrated, all of which data are entered into a customer record block in the data processing system through operator terminal means. When a customer requests a specific demonstration, the operator enters a demonstration call number into the data processing system, and through control of the switching means, causes the audio program repeating means to play the demonstration. Once the demonstration has been played, the data processor returns the customer to an operator, preferably the previously assigned operator, who will then communicate with the customer to determine whether or not an order is to be placed for the merchandise or services just demonstrated. If so, the operator enters an order into the data processor. That entry is made through the terminal means to the data processor which in turn causes the order to be transferred to magnetic storage means for processing. Before the first order is accepted, the operator may request credit verification through the data processor or other means using the customer's credit card or account number. After each demonstration and order, or rejection, the customer service operator may determine if there are other demonstrations the customer wants to hear or, in the case of an unfruitful customer, may terminate the customer's call.

In the case of telephone communications with a customer having a push-button telephone, the operator may instruct the customer to key in his request for a demonstration, and in that event, the operator may place the customer's call on automatic telephone service which causes the data processor to communicate with the customer through prerecorded messages played to the customer through the audio repeating means and codes entered by the customer through his telephone keyboard. An alternative way of entering this second mode of service is through the customer calling a distinct telephone number for a line which the data processor recognizes as being from a customer who has a push-button telephone and wishes automatic telephone service. A modified automatic telephone service may be provided in a third mode to customers through a licensed retailer of merchandise or services through the equivalent of push-button telephones. After a requested demonstration has been played, the customer may purchase the merchandise or services directly from the licensed retailer. In either the second or third mode, the data processor responds to codes entered through a push-button keyboard without any intervention from a human operator. Each code places the data processor into an appropriate routine to cause a prerecorded message to be played by the program repeating means to the customer at each point in the transaction. The customer responds to the messages by keying in appropriate codes.

BRIEF DESCRIPTION OF THE DRAWINGS

FIGS. 3a and 3b are flow charts of the present invention operating in an operator-attended mode.

FIG. 5 is a flow chart for the general procedure of selecting a prerecorded message to be played from an audio program repeater.

FIG. 6 is a flow chart for receiving incoming calls from push-button telephones.

DESCRIPTION OF PREFERRED EMBODIMENTS

Figure 1:
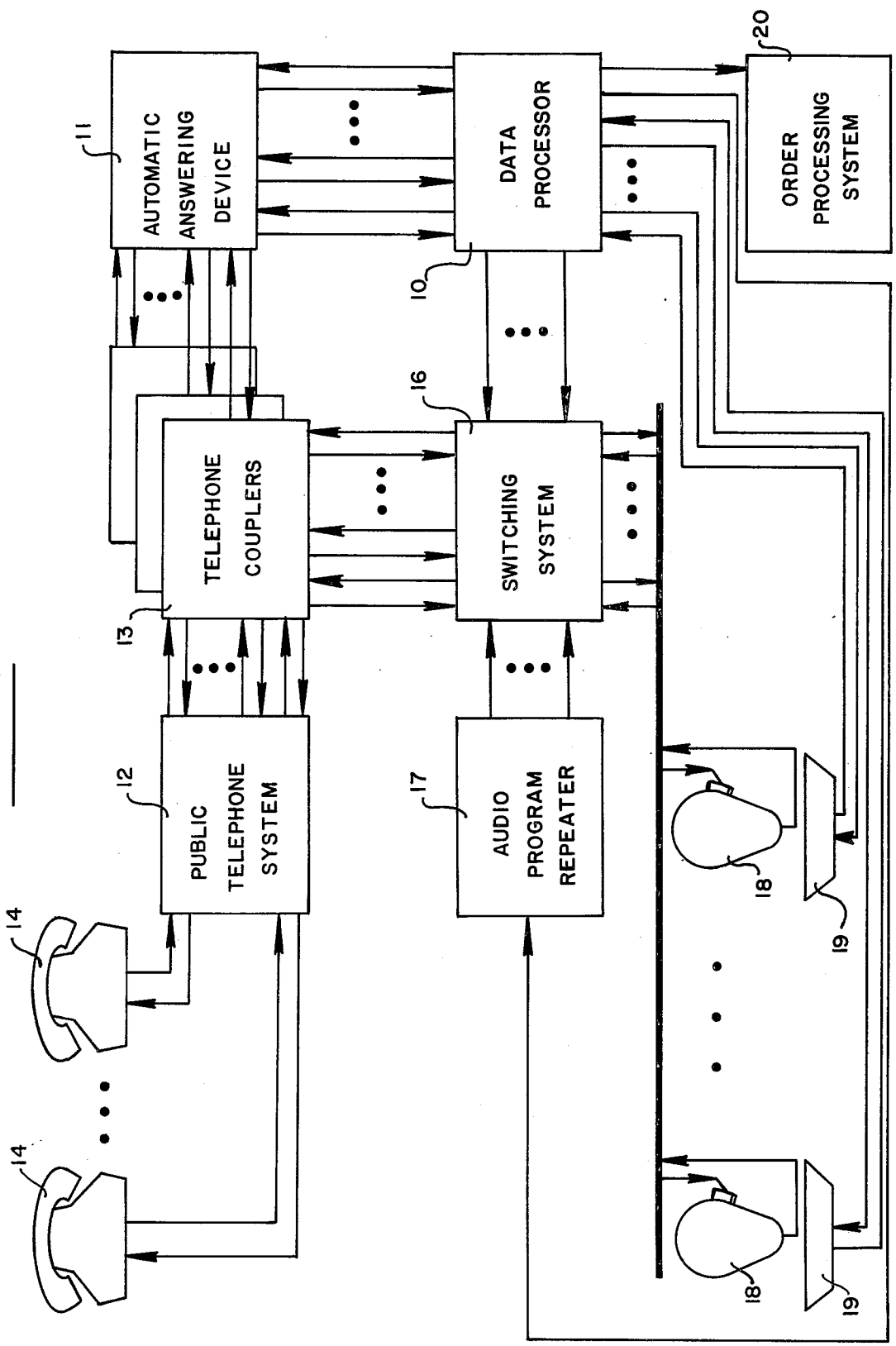
FIG. 1 illustrates a functional block diagram of an exemplary embodiment of the present invention.

Referring now to the drawings, FIG. 1 illustrates the basic concept of the invention in which a data processor 10 is connected by an automatic answering device 11 to a public telephone system 12 via telephone couplers 13. All telephones 14 connected to the system are assumed to be of the dial or push-button signalling type. The address information generated by the dial pulses, or push-button tones, establishes the basis for subsequent operations of the telephone system to connect a calling subscriber with the data processor 10 at a telephone record marketing store.

The data processor operates a switching system 16 to selectively connect an incoming call from a customer to an audio programmer repeater 17, or a customer service operator 18 who communicates with the customer through the switching system 16 and data coupler 13, and with the data processor 10 through an alphanumeric video terminal 19 which has a cathode ray tube for the display of alphanumeric information, a typewriter keyboard and a numeric cluster keyboard.

When a customer calls a telephone number of the telephone record marketing store, the transmitting and receiving equipments of the marketing store are connected to the telephone system 12 by one of the data couplers 13 dedicated to the telephone number called.

The coupler may be any one of a number of different types commercially available for attaching customer supplied equipment to a line of the public telephone system. The coupler provides an automatic subscriber terminal capable of originating, answering and terminating a call without a human operator except for operating the telephone. In this telephone record marketing system, the telephone is operated by an automatic answering device 11 which effectively lifts the telephone handset from its cradle in response to a ringing signal, and effectively replaces the handset when the data processor instructs that a call be terminated.

The data processor 10 is programmed with an interrupt routine to respond to each signal received from the automatic answering device 11 and automatically connect the customer's telephone line via a coupler 13 to a predetermined one of a plurality of audio-program repeater channels which plays a "hello" message explaining that a customer service operator will be with the customer in a moment. The data processor controls the audio program repeater by initiating operation of the required channel and connecting the channel to the customer's line through the switching system. When the "hello" message has been completed, the repeater signals the processor which then switches the customer's telephone line to one of a plurality of available customer service operators through the switching system. If there is not an operator available, the data processor queues the customer's call. If the queue is long, the data processor switches the customer's line to a second continuously playing channel of the program repeater on which entertaining music is played or on which a medley of a wide variety of excerpts from currently available recordings is played with titles and recording artists dubbed in. Once an operator is free, the data processor is interrupted to connect the next customer to a customer service operator.

The telephone record marketing store will, in practice, subscribe to a plurality of telephone lines in order to receive more than one call at any given time. A separate telephone coupler will therefore be provided for each of the telephone lines with an automatic rotary system that assigns incoming calls to available couplers in sequence until all couplers are in use. Any subsequent customer calling will receive a busy signal.

The automatic answering device will likewise be adapted with a plurality of two-wire lines, one line for each coupler which will effectively pick up the handset and transmit a "call received" signal to the data processor over a distinct line. The processor continually samples all the lines for call-received signals and queues the calls received for the "hello" message playing for a previous call or calls. Following that, the calls are transferred by the data processor to customer service operators or, in the case of no operator being available, to the continuously playing channel of the audio program repeater while the queued calls are waiting to be assigned to service operators from an operator availability table maintained by the data processor.

Once a customer service operator is placed in communication with a customer by the data processor through the switching system 16, the processor displays a message on the CRT screen of the operator's terminal indicating that a new customer is on the line. The operator then greets the customer and elicits from the customer identification data such as name, address, and account or credit card number. The operator keys the identification data into the data processor through the terminal 19 for credit verification and asks the customer what may be done for the customer. The customer may respond with an order to be entered without any demonstration, but will more often respond with a request for a particular demonstration. The operator then elicits from the customer sufficient identification of the particular demonstration, preferably in the form of a directory number assigned to the requested demonstration and published in a catalog by the telephone record store. However, it is not necessary that the customer have the store directory number because the operator may search for it through the data processor in which cross-indexing tables are stored for the labels, titles and recording artists. The operator then keys the directory number of the demonstration into the data processor which checks inventory levels of that recording and notifies the operator of any potential delivery problem. The operator may then discuss the problem with the customer. If there is no delivery problem, the data processor switches the customer operator off the line, and connects the customer to the appropriate audio program repeater channel for the requested demonstration. While the requested demonstration is playing (typically for 30 seconds) the customer service operator is available to service other customers.

When the requested demonstration has been completed, the data processor is interrupted by the audio program repeater. The processor then disconnects the audio program repeater from the customer's line and switches the customer's line back to an available operator giving preference to the operator who serviced the demonstration request for that customer. The operator readily picks up the transaction with the customer through a video display presented to the operator by the data processor which includes all of the data for that customer's call including any historical and credit verification data which the processor has recovered from memory using the customer's account or credit card number. The operator then asks the customer if the recording just demonstrated should be delivered. If the customer responds in the affirmative, the operator enters that information in the customer's block of data on display and asks whether the customer wishes to hear any other demonstration. If so, the procedure just described is repeated, and if not, the operator may ask whether the customer wishes to hear any other demonstration.

Once the customer indicates that there are no further demonstrations to be heard, the operator thanks him and terminates the call, whereupon the customer's block of data is returned to a master file, but if an order has been entered, the data processor first transfers the order to an order processing system 20 with the name, address, and any other information required to fill the order, such as the account or credit card number. By then the processor could have the credit verification function complete. Alternatively the credit verification function may be conducted off line by the order processing system in the course of processing the order.

If the customer does not have an acceptable account or credit card number, the operator asks the customer whether the order is to be prepaid or shipped collect on delivery (C.O.D.). The choice made by the customer is keyed in by the operator at the time the order is placed and transferred as part of the order data by the data processor to the order processing system.

As orders are transferred to the order processing system, the data processor updates inventory level data in order that each operator have up to the minute information as to the availability of recordings offered in the different forms, namely phonograph records, tape cartridges, and tape cassettes.

Before signing off to terminate a call with a customer, the data processor enters the date and time into the order, to be able to alert the operator if a customer has placed another order on the same day, quite possibly with another operator. If so, the customer service operator may key in an instruction to the order processing system to batch the current order with a previous order.

The order processing system may be comprised of a magnetic disk pack and/or magnetic tape unit to accumulate all of the orders for a given period, which may be an entire business day. Once the order period has been closed, the orders are processed off-line in order to batch orders to the same customer and to prepare shipping labels, packing slips and account (or credit card) charge slips. Orders to be prepaid or shipped C.O.D. are set aside for further manual processing in respect to preparing and mailing a statement to be prepaid or for preparing C.O.D. documents.

From the foregoing it is evident that the telephone record marketing store is comprised of a highly automated system capable of maintaining a complete record of all transactions to present to the customer service operator a very accurate and informative profile of a calling customer. The system also maintains current inventory data in order to be able to advise customers of potential delivery problems and to initiate reorders of recordings from suppliers. In addition, all orders processed in a given day may be sorted and counted to identify sales trends by reporting the number of times each demonstration has been requested, and the total number of sales that have resulted for each demonstration.

Although the telephone record marketing system described with reference to FIG. 1 has relied upon a human customer service operator for customer communications, the functions of the customer service operator may be replaced by programmed subroutines in the data processor and messages prerecorded on channels of the audio program repeater. The customer responds by keying codes into the data processor through a pushbutton telephone. A variation on this push-button telephone communication approach allows the telephone record marketing system to serve subscribing retail establishments as a means for demonstrating recordings to customers wishing to make purchases from the retail establishments which have suitable Touch-Tone keyboards and data coupling sets coupled to the data processor through direct private lines, or through public telephone system lines and a data coupler. These variants will be described more fully hereinafter with reference to a preferred embodiment of the invention shown in FIG. 2.

As a further variation of the system in its use, though not its organization, other types of merchandise may be sold by telephone where an audio demonstration or description would help the customer make a decision. Included are tickets to movies or stage shows, video recordings, books or recordings of books on tape, pay television shows, games and many other types of general merchandise. The system is also useful in providing descriptions of merchandise, services, or other types of information, to the blind and otherwise handicapped, as well as to those with reading or language difficulties. The data processor is provided with a master file having a directory of the merchandise or services offered by title, artist's name, author and other descriptives so that customer service operators with no special knowledge of the current merchandise or services offered can respond to requests for demonstrations by any descriptive that the customer is apt to use. Once the demonstration requested has been played, the customer can determine for himself whether or not the customer service operator has properly matched his request. If not, other attempts may be made using other descriptives the customer or operator can think of, but since this relies heavily upon voice communication between the customer and the operator, the direct communication mode from a push-button telephone or Touch-Tone keyboard would be feasible only for those customers having a printed directory of merchandise or services offered. Such directories may be updated and distributed to customers with instructions for the customer who desires direct communication to call a distinct telephone number using their push-button telephone or Touch-Tone keyboard.

Figure 2:
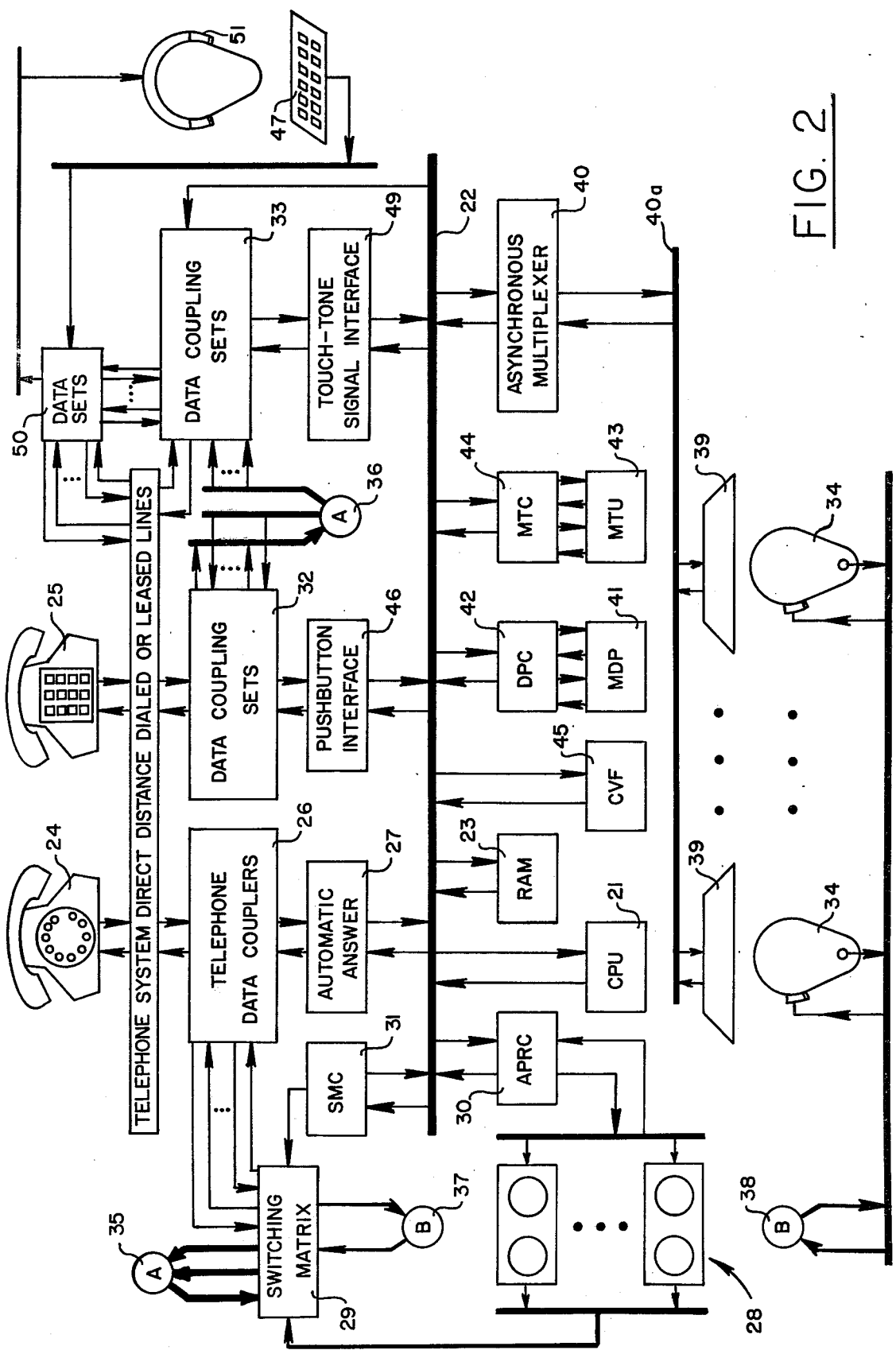
FIG. 2 illustrates a functional block diagram of a preferred embodiment.

Before proceeding with a description of a preferred embodiment with reference to FIG. 2, it should be noted that there is no theoretical limit to the quantity of recorded demonstrations that the telephone record marketing system can have in its audio program repeater, but costs in implementing the audio program repeater will place a practical limit of about one hundred selections. However, additional merchandise may be stocked, cataloged and sold without demonstration where the customer is certain of the selection, particularly if the customer has in hand a catalog of merchandise offered.

Referring now to FIG. 2, a data processor for the telephone record marketing system is comprised of a central processing unit (CPU) 21 and a bus 22 through which the CPU communicates with other units, including a random access memory 23.

In a first mode of operation, which involves voice communication between the customer and a customer service operator, a dial telephone 24 or push-button telephone 25 is coupled to the CPU by one of a plurality of telephone data couplers 26 (such as a CBS data coupler offered by American Telephone and Telegraph Company) and an automatic answering device 27 which functions solely as a telephone answering interface for signalling the CPU when there is an incoming call and terminating the call (i.e., "hanging up") when the CPU so instructs.

The CPU responds to an incoming call with a command to an audio program repeater 28 to play a "hello" message to the customer through a switching matrix 29. The audio program repeater is coupled to the bus 22 by an audio program repeater coupler (APRC) 30 which functions as an interface between the repeater and the CPU to permit instructions from the CPU to turn on a selected channel of the repeater. Although the repeater may be implemented with magnetic discs or other record media, the preferred implementation is endless-loop magnetic tape magazines, each magazine having a plurality of channels (e.g., four channels), in a drive system which permits selecting one or more of the magazines to be driven at any one time. Alternatively, all magazines may be constantly driven, if the traffic warrants it, so that selection of a demonstration requires only a proper connection to be made in the switching matrix. Selectively driven magazine program repeaters are commercially available from MacKenzie Laboratories, Inc. of Arcadia, Calif.

The switching matrix 29, also controlled by the CPU through the bus 22, is coupled to the bus by a switching matrix controller (SMC) 31 which receives and stores switching commands from the CPU, and transmits interface busy signals to the CPU when there is some interference between already existing switching commands in the controller and new switching commands. The switching commands are decoded by the controller to energize a selected one of a plurality of solid-state switching devices which interconnect an array of horizontal wires with an array of vertical wires. The horizontal wires may, for example, be connected to the telephone data coupler 26 (and to similar units 32 and 33 to be described more fully hereinafter) while the vertical wires of the switching matrix are connected to channel output terminals of the audio program repeater 28 and to telephone operators 34.

Circles 35 and 36 in the diagram containing the letter A schematically represent that buses connecting 2-wire lines from the units 32 and 33 to the circle 36 are to be connected to horizontal lines of the switching matrix 29 from the circle 35. Similarly, circles 37 and 38 containing the letter B schematically represent that a plurality of 2-wire lines are connected to vertical lines of the switching matrix for two-way voice communications, one 2-wire line for two-way communication from the customer service operator to the customer and from the customer to the customer service operator through one of the telephone data couplers 26. In that regard it should be noted that all lines through the switching matrix are intended for transmission of audio signals in both directions through the use of bilateral solid-state switching devices in the matrix. An alternative is to use unilateral solid-state switches. This alternative has a disadvantage of requiring two 2-wire matrixes for voice communication between the customer and the customer service operator, but has an advantage in that all other switches in one matrix for transmission to the customers are then capable of transmitting prerecorded messages or demonstrations from the program repeater 28 to a number of customers simultaneously without any one customer being able to transmit a voice signal into the matrix for coupling to another customer. In that manner any comments voiced by one customer listening to a message or demonstration will not be heard by any other customer listening to the same message or demonstration.

Each operator is provided with an alphanumeric video terminal 39 coupled to the bus 22 through an asynchronous multiplexer 40 and bus 40a to provide digital communication between the CPU and the terminal in both directions, one direction for displaying data for the operator under control of the CPU, and the other for transmitting information to the CPU which has been keyed in by the operator at the terminal. Both a magnetic disc pack (MDP) 41, with its disc pack controller (DPC) 42, and a magnetic tape unit (MTU) 43, with its magnetic tape controller (MTC) 44, are shown in FIG. 2 to complete the preferred embodiment of the more general system shown in FIG. 1. In addition, there is a credit verification function (CVF) 45 which the CPU accesses under control of a programmed subroutine for credit verification. The CVF is accessed by account or credit card number and is maintained current on a day to day basis. If the credit verification function cannot be carried out by the CPU on line, such as when there is not a credit report on file for the customer, the customer service operator may, through independent telephone lines (not shown) verify credit by calling the credit card issuer (in the case where the customer has given a credit card) or by calling a credit bureau to which the telephone record store subscribes.

From the foregoing description of FIG. 2 it is evident that this preferred embodiment implements the more general system of FIG. 1 in a direct and straightforward manner using a bus-oriented architecture in which the CPU addresses all units, including the random access memory 23, through a single high-speed bus. Central processing units for data processing systems having such a bus-oriented architecture are commercially available. For example, the PDP-11 family of CPUs manufactured by Digital Equipment Corporation use a single high-speed bus to communicate with all peripheral units through interface units or controllers.

An advantage of a bus-oriented system is the facility with which additional peripheral units may be included in the system by simply coupling the units to the bus through appropriate interface units or controllers. For example, to implement the push-button mode alluded to hereinbefore, wherein a customer having a push-button telephone communicates with the telephone record marketing system through the keypad of the telephone, data coupling sets 407A-L1 or 403 made by American Telephone and Telegraph Company (AT&T) may be used as shown for the coupler 32 between a push-button telephone and a push-button interface 46.

The push-button telephones connect to the data coupling sets 32 through a telephone system of direct distance dialed or leased lines by simply keying in distinct telephone numbers for the telephone lines connected to the data coupling sets. If a push-button telephone customer wishes the assistance of a customer service operator, the customer keys in the telephone number of a telephone line connected to the coupler 26. Alternatively, having established communications through a data coupling set, the "hello" message may instruct the customer to key in a specified code if operator assistance is desired, and if not that the customer key in an established account number having a code reserved for push-button telephone customers. If the credit verification function cannot validate the automatic push-button telephone customer, operator assistance is automatically initiated by the CPU. Otherwise the CPU will command the audio program repeater to play a prerecorded message to communicate with the customer as necessary. In that manner the transaction is carried out by the CPU without operator assistance. At each step, any entry required is made by the customer through his telephone keyboard in response to a message played by the audio program repeater under control of the CPU. Thus, once the push-button interface 46 signals through the CPU that a customer is on the line, the CPU will initiate communications with the customer by commanding the audio program repeater 28 to initiate a "hello" message and commanding the switching matrix coupler 31 to connect the "hello" message channel of the repeater to the customer's line through a data coupling set. Included in the "hello" message will be the first instruction given to the customer. The CPU will follow up with messages as required by the transaction.

A Touch-Tone control of demonstrations may be offered to customers of a subscribing record store or a department store in a manner alluded to hereinbefore with reference to FIG. 1. That service is implemented in a manner very similar to the push-button telephone service just described except that customers use Touch-Tone keyboards 47 to call through data coupling sets 33 connected to the bus 22 by a Touch-Tone signal interface 49.

Data sets 50 may be employed to couple the Touch-Tone keyboards 47 to the data coupling sets in order to adapt the keyboards to the data coupling sets. The latter may be a modified AT&T 407A-L1 or 403, and the data sets 50 may be connected to the data coupling sets 33 by direct leased lines or through the public telephone system, both of which are shown. The data sets have audio return lines to customer headsets or sound booths for the customers to hear the demonstrations. Any one customer is shown with one keyboard and one headset 51, but it is to be understood that a plurality of keyboards and headsets (or sound booths) would be provided. A data set cooperates with a keyboard to simulate a push-button telephone with one-way audio signal transmission to the customer, and and one-way Touch-Tone transmission from the customer.

The manner in which the CPU may be programmed for each function will now be described with reference to flow charts illustrating representative function. The first function illustrated in FIG. 3a is for responding to an incoming call on a telephone line connected to one of the data couplers 26 for an operator attended mode in which a received call initiates a "hello" message. If the hello message is currently in use, that call is batched with other incoming calls and held until the "hello" message becomes available. The CPU then commands the automatic answering device 27 to go off-hook and commands the switching matrix 29 to connect the "hello" message to the line of each customer calling. Once that message is complete, the calls are connected to separate operators. As each is assigned, the next is taken up and the question asked: Operator available? If not, the calls are queued and the question is asked: Is the operator queue long? If it is, the queued calls are connected to a "filler" tape having entertaining music, or a medley of recordings being offered for sale with titles and recording artists dubbed in.

FIG. 3b illustrates operator attended functions. First the operator elicits customer data and the selection requested for demonstration. Once that is entered by the operator the CPU determines whether or not this is a selection request. If not, the CPU asks the operator whether an order is to be taken. If so the operator enters the order. In the more usual case, there is a selection requested. Before a demonstration of the selection is played, the CPU determines if there is a potential delivery problem. If so, the CPU asks the operator if the customer wants to change his selection. If so, it goes back to the entry point of the routine, and if not, a demonstration (excerpt) of the selection is played. This requires the CPU to control the switching matrix for the outgoing message/selection. When the demonstration is complete, the CPU determines whether the previous operator is available for the customer. If so, the operator is connected, and if not, the CPU determines if any operator is available and connects the customer to an available operator. If none is available, the customer is connected to the "filler" tape. Once the customer is connected to the operator, the routine is reentered. A flag set for a selection request previously made is reset when the request is filled by playing the request, so the CPU now branches and asks the operator whether an order is to be placed. If so, the operator enters the order. At this point the CPU can again inquire about potential delivery problems, etc. and indicate to the operator potential revisions in the information previously given. The CPU then asks the operator if there are any other selection requests. If so, the routine returns to the entry point, and if not, the operator proceeds to verify the order, if any, and then the operator signs off. If no order is to be taken after a demonstration of a selection requested, the CPU asks the operator if there is any other selection desired. If so, the routine returns to the entry point. If not, the operator verifies any order placed and signs off. In that way the CPU controls communications with the customer through the operator, so that each time through the routine for a succession of selection requests, the customer can be assigned to a different operator who, through the video display of the entire transaction and prompting questions by the CPUs can step in and advance the transaction to the next step.

Figure 4:
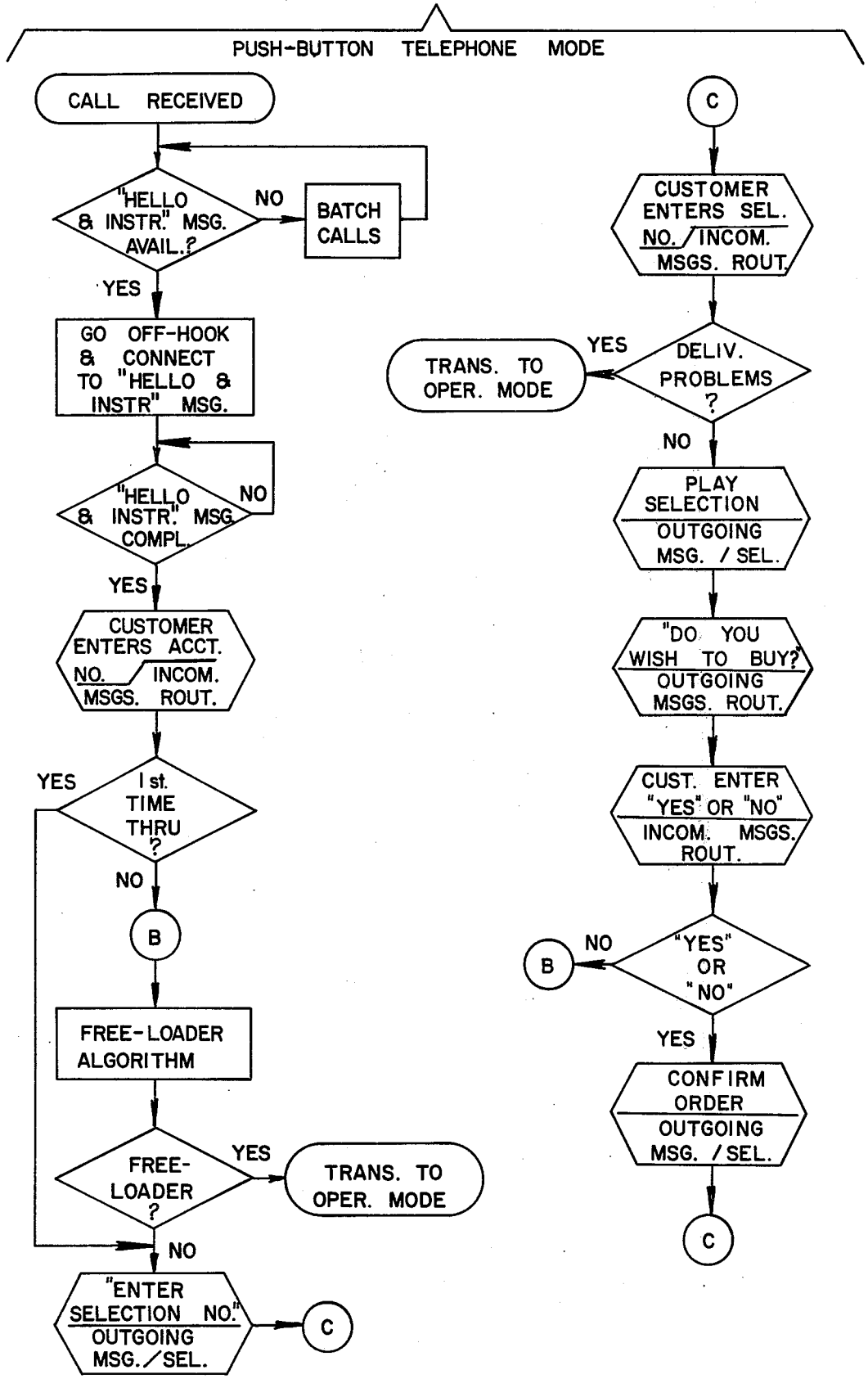
FIG. 4 is a flow chart of the present invention operating in an automatic (push-button) telephone mode.

FIG. 4 illustrates a routine for receiving a push-button telephone call. The first part of the routine is similar to receiving a call in the operator attended mode for playing the "hello" message, except that the message is one which concludes with an instruction for the customer to enter his account number. If it is the first time through for the customer, he is then instructed to enter his selection number. Once the selection number is entered, a check is made for potential delivery problems. If there are any, the cell is transferred to an operator mode for discussion of the problem. If not, an excerpt of the selection is played as a demonstration and an audio message is transmitted to the customer asking him if he wishes to buy the selection. The customer enters YES or NO. If yes, an audio confirming message is transmitted to the customer, and if not, the routine branches back to ask again for a selection number, but first an algorithm is employed to determine if this customer is a free loader. If so, the call is transferred to an operator. Each time a customer calls, a check is made to determine if it is the customer's first time through, and when it is not the free loader algorithm is used. The algorithm will involve criteria which will evolve with the history of the particular customer modified by statistics of all customers over a period of time. The criteria will require monitoring and modification from time to time. For example, five selection requests over a short period of time (less than a day) without a purchase may indicate a free loader, while the same number of requests over several days may not.

FIG. 5 illustrates the simple routine required for outgoing messages or demonstrations on selected channels. The CPU first determines if a selected channel is available. If so, the channel output is connected as required, and if not the CPU determines if there is an excessive delay expected (more than 10 seconds). If so, it connects the "filler" tape instead, and if not, it returns to the entry point.

FIG. 6 illustrates a routine for accepting requested data from a push-button telephone. First a timer routine is started to give the customer 15 seconds to enter the requested data which is then checked. If the customer wants assistance, the customer enters "0" and the call is transferred to an operator. If "0" has not been entered, the data entered is checked for format. If valid, the data is accepted, and if not, the customer is given a second try. An error message is played back to the customer instructing him what to do. If again the format check fails, the call is transferred to an operator. Each time the routine is entered or reentered, the timer routine is reset, and if it should time out before the customer has entered any data, the customer is given another chance through the retry counter. (A prompting error message is transmitted.) If again the timer times out, the call is terminated on the assumption the customer has hung up.

From the foregoing examples of routines and the detailed description of a preferred embodiment of a telephone system for marketing goods or services capable of being demonstrated by a brief recorded description or excerpt, it is evident that there is great flexibility in adding, modifying and deleting functions without any reorganization of the architecture. Consequently, although particular functions have been described and illustrated herein it is recognized that modifications and variations may readily occur to those skilled in the art. It is therefore intended that the claims be interpreted to cover such modifications and variations.

What is claimed is:

1. In a system for audio demonstration of merchandise or services offered over a telephone line, the combination comprising
    an audio program means having a plurality of channels, one for each prerecorded demonstration,
    a data processor for selecting a channel of said repeating means for connection to said telephone line,
    switching means responsive to said data processor for connecting a selected channel to said telephone line, and
    a plurality of customer service operator terminals selectively connected to said telephone line by said data processor through said switching means.

2. The combination of claim 1 wherein one of said audio program repeating means includes a channel on which a greeting message is stored for playing on a telephone line when an incoming call is to be acknowledged by said data processor before connecting the telephone line of the incoming call with a customer service operator terminal through said switching means, and including an automatic telephone answering means for signalling to said data processor when an incoming call is present.

3. The combination of claim 2 wherein each customer service terminal includes a video display panel connected to said data processor for display of a customer record block as the transaction progresses, and a keyboard for the customer service operator to enter data elicited from the customer, including customer identification data, demonstration request data, and order data.

4. The combination of claim 3 including magnetic storage means coupled to said data processor for storing customer identification and order data for each order placed, said magnetic storage means being adapted for use in processing orders.

5. A method of marketing merchandise or services by telephone using brief prerecorded demonstrations stored in an audio program repeater to demonstrate selected merchandise or services to a customer under control of a data processor comprising the steps of
    answering a customer's telephone call on an incoming line through automatic answering means and signalling to said data processor that a customer is on the line,
    transmitting a prerecorded greeting message from said audio program repeater under control of said data processor to the customer to acknowledge receipt of the call and to instruct the customer what to do next in order to request a selected demonstration, transmitting a selected demonstration from said audio program repeater to the customer under control of said data processor, interrupting said data processor when the selected demonstration has been completed for the purpose of transmitting a further communication to the customer, and transmitting the further communication to the customer as a prerecorded message from said audio program repeater transmitted under control of said data processor to determine whether any other demonstration is to be requested, the customer responding to each prerecorded message with a code entered from a push-button keyboard on the premises of a subscribing retailer, whereby all communications with the customer are automatically controlled by said data processor.

6. A method of marketing merchandise or services by telephone using brief prerecorded demonstrations stored in an audio program repeater to demonstrate selected merchandise or services to a customer under control of a data processor comprising the steps of answering a customer's telephone call on an incoming line through automatic answering means and signalling to said data processor that a customer in on the line, transmitting a prerecorded greeting message from said audio program repeater under control of said data processor to the customer to acknowledge receipt of the call and to instruct the customer what to do next in order to request a selected demonstration, transmitting a selected demonstration from said audio program repeater to the customer under control of said data processor, interrupting said data processor when the selected demonstration has been completed for the purpose of transmitting a further communication to the customer, the greeting message instructing the customer to wait for a customer service operator, and said data processor being interrupted upon completion of each prerecorded transmission from said audio program repeater to connect a customer service operator with the customer, whereby the customer service operator elicits from the customer identification data, demonstration requests and orders, and the customer service operator enters the information elicited from the customer to cause said data processor to transmit requested demonstrations from said audio program repeater and to transmit orders elicited to an order processing system.

7. A method as defined in claim 6 wherein said data processor alternately connects said audio program repeater and said customer service operator with the customer through a switching system controlled by said data processor.

8. A method as defined in claim 7 wherein said customer service operator is selected from a plurality of customer service operators.

9. A method as defined in claim 8 wherein the one of a plurality of customer service operators selected for a particular occasion during a single telephone call is preferably the same operator previously selected for the same customer, but may be any operator available at the time, and where said data processor presents a video display of the customer record block to the operator selected to enable the operator to assess the situation and elicit from the customer the next piece of information necessary to carry the transaction further, or to terminate the call, whichever the situation requires.

10. A method as defined in claim 9 wherein said data processor maintains status records of the availability of merchandise or services offered for sale, and said status records are continually updated as orders are entered, and wherein each demonstration request entered by an operator causes said data processor to look up in said status records the availability of the merchandise or services to be demonstrated, and to present in the video display the current availability status for discussion with the customer if there is any availability problem.

11. Apparatus for marketing merchandise or services by telephone using brief prerecorded audio demonstrations of the merchandise or services, comprising means for storing at least one prerecorded message and said audio demonstrations for selective repeating, a data processor, automatic answering means for answering a customer's call and signalling said data processor that a customer is on a customer line, means responsive to said data processor selectively switching said customer line to a selected prerecorded message or demonstration from said repeating means, or to a customer service operator, and a terminal for said customer service operator to enter customer data, demonstration requests and orders into said data processor and to receive on a video display terminal a customer's record block as the operator elicits requests for demonstrations and, after each demonstration controlled by said data processor through said switching means, elicits orders for the demonstrated merchandise or service, and enters into said record block demonstration requests and orders received.

12. Apparatus as defined in claim 11 wherein said switching means connects said customer line to one of a plurality of customer service operators, and a plurality of terminals, one for each operator to enable any operator connected to a customer line following a demonstration to carry on the transaction from the customer record block of the customer's call.

13. Apparatus as defined in claim 11 including an order processing system connected to said data processor and under control of said data processor for receiving customer orders for processing.

14. Apparatus as defined in claim 12 wherein said order processing system is comprised of magnetic storage means adapted to be used for processing of orders independent of said data processor.

15. A method of marketing merchandise or services by telephone using brief prerecorded demonstrations stored in an audio program repeater to demonstrate selected merchandise or services to a customer under control of a data processor comprising the steps of answering a customer's telephone call on an incoming line through automatic answering means and signalling to said data processor that a customer is on the line, transmitting a prerecorded greeting message from said audio program repeater under control of said data processor to the customer to acknowledge receipt of the call and to instruct the customer what to do next in order to request a selected demonstration, transmitting a selected demonstration from said auido program repeater to the customer under control of said data processor, interrupting said data processor when the selected demonstration has been completed for the purpose of transmitting a further communication to the customer, transmitting the further communicatin to the customer as a prerecorded message from said audio program repeater transmitted under control of said data processor to determine whether the customer wishes to order the merchandise or service just demonstrated and whether any other demonstration is to be requested, the customer responding to each prerecorded message transmitted with a code entered from a push-button keyboard on the customer's telephone, whereby all communications with the customer are automatically controlled by said data processor.

16. A method as defined in claim 15 where the greeting message instructs the customer to enter identification data into said data processor through the push-button keyboard of the customer's telephone after which said data processor causes an audio program repeater to transmit a further prerecorded message instructing the customer to enter into said data processor a selection code of a demonstration to be heard, whereupon said data processor transmits the requested demonstration to the customer from said audio program repeater.

17. A method as defined in claim 16 wherein said data processor responds to a code entered from a push-button keyboard on the customer's telephone for an order of merchandise or services corresponding to the requested demonstration just completed by transmitting an order to an order processing system.

* * * * *